United States Patent [19]

Merritt et al.

[11] Patent Number: 5,000,118
[45] Date of Patent: Mar. 19, 1991

[54] AQUATIC/TERRESTRIAL DISPLAY UNIT

[76] Inventors: Gail A. Merritt, 2154 W. Cullom Ave.; Jonathan G. Bloom, 2909 N. Albany, both of Chicago, Ill. 60618

[21] Appl. No.: 426,407
[22] Filed: Oct. 24, 1989
[51] Int. Cl.⁵ ............................................. A01K 63/00
[52] U.S. Cl. ...................................... 119/5; D30/101
[58] Field of Search .................... 119/3, 5; 239/16, 17; 30/101, 105

[56] References Cited

U.S. PATENT DOCUMENTS

| 1,838,215 | 12/1931 | De Clairmont | 119/5 |
| 4,117,805 | 10/1978 | Ward | 119/5 |
| 4,754,571 | 7/1988 | Riechmann | 119/5 |
| 4,781,938 | 12/1988 | Davenport | 119/5 |
| 4,836,142 | 6/1989 | Duback | 119/5 |

*Primary Examiner*—John G. Weiss
*Attorney, Agent, or Firm*—Klarquist, Sparkman, Campbell, Leigh & Whinston

[57] ABSTRACT

An aesthetically pleasing aquatic/terrestrial display unit provides a variety of novel optical effects, including the illusion whereby aquatic and terrestrial environments are superimposed, sometimes with their geometrical relationships seemingly altered by attendant lensing effects.

3 Claims, 2 Drawing Sheets

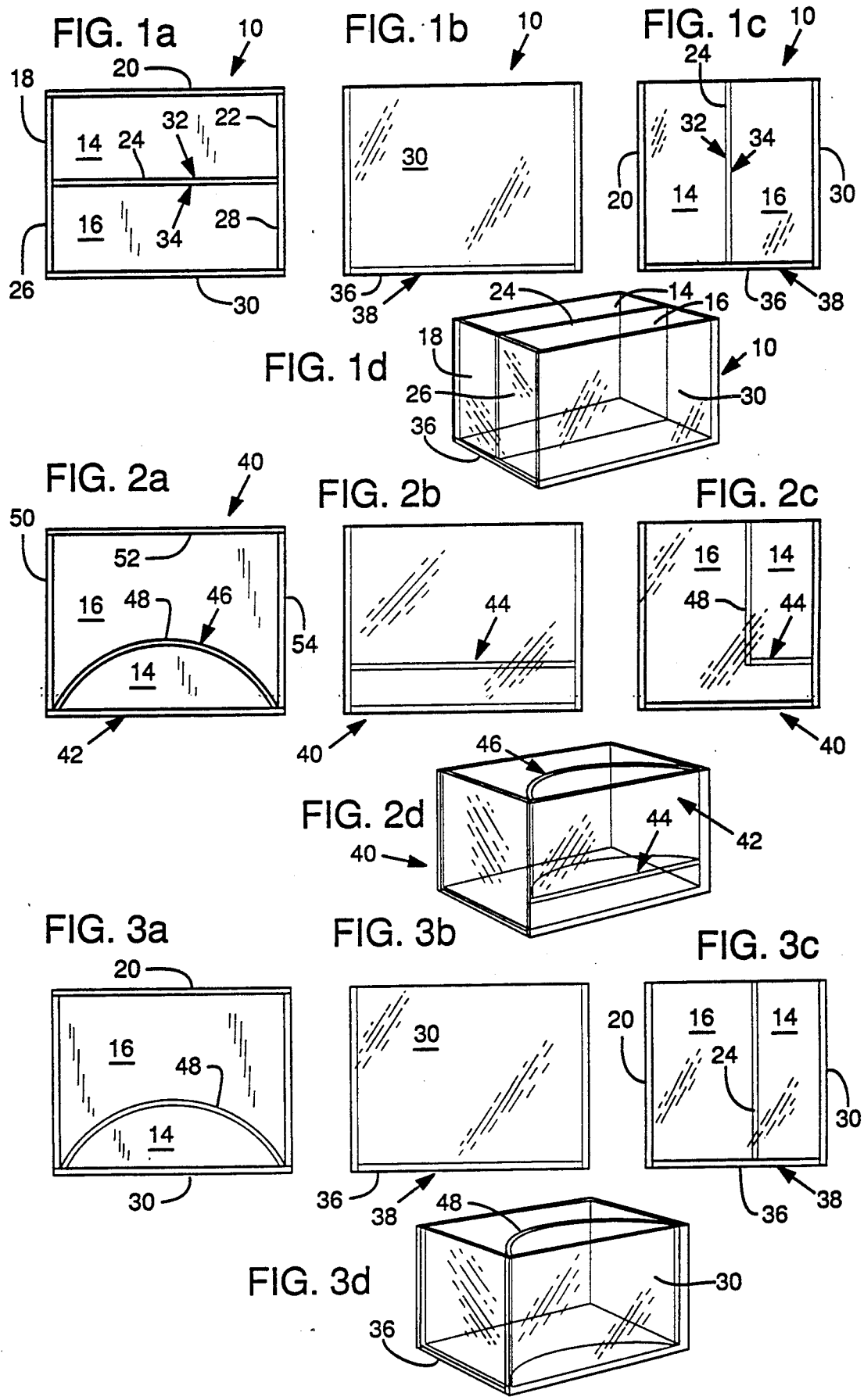

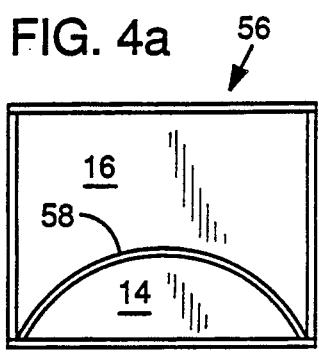
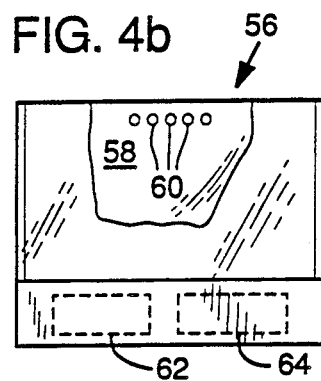
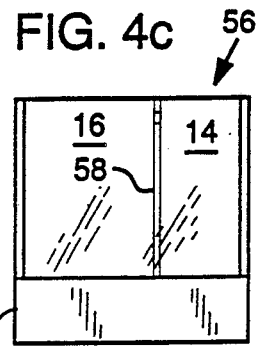
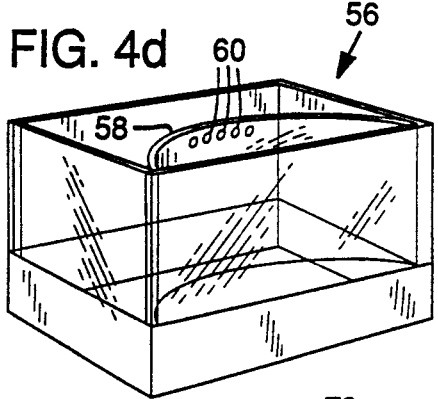
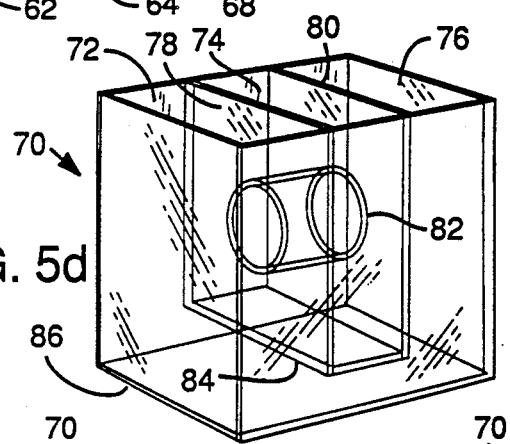
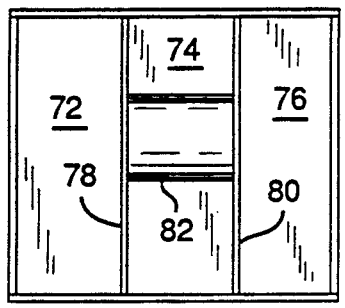
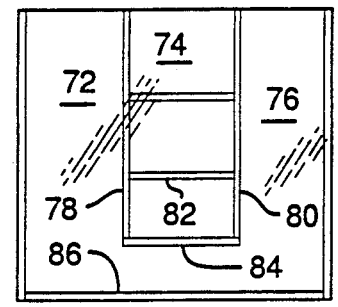
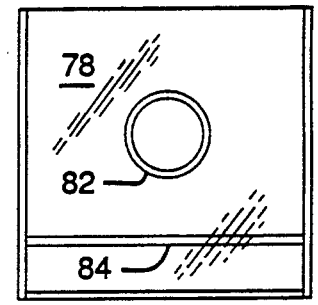
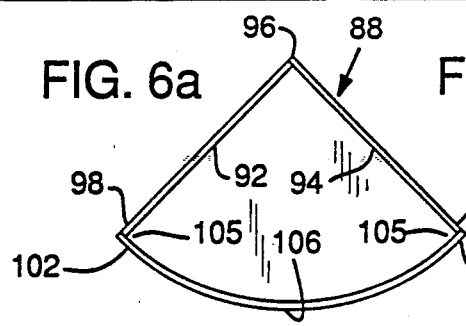
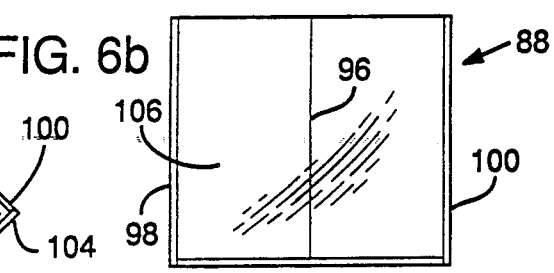
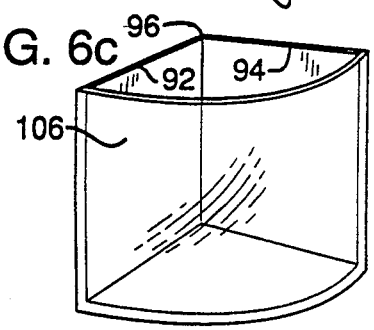
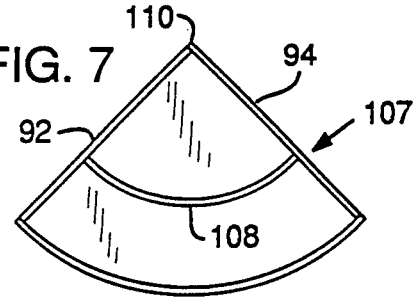

AQUATIC/TERRESTRIAL DISPLAY UNIT

FIELD OF THE INVENTION

The present invention relates to aquariums and terrariums of the sort used by hobbyists, interior designers and the like to provide visually pleasing displays of aquatic and terrestrial life.

BACKGROUND AND SUMMARY OF THE INVENTION

Aquariums and terrariums have long been used by hobbyists and amateur naturalists to provide environments suitable for small fish, animals, and other biological specimens. The popularity of aquariums and terrariums has recently spread to interior designers, whose interest in the units stem from their aesthetic appeal.

In the prior art, aquariums and terrariums have been made of sheet glass, bonded together to form watertight rectangular enclosures. Recent advances in the field have been principally directed to improvements in ancillary accessories, such as lighting units and pumping-/filtration/aeration equipment, while the design of the basic unit has been left substantially unchanged.

In contrast, many advances have been made in large scale displays of aquatic and terrestrial life—the sort found in zoos and municipal aquariums. These displays have evolved from barren, large rectangular enclosures to aesthically appealing designs. Some of these large scale displays even include provisions for surrounding the viewer with the environment being displayed. Exemplary are new municipal aquariums in which certain displays have glassed-in tunnels traversing the bottom of the tank from which viewers can observe the surrounding marine life. Such advances, however, are obviously not readily applicable to the terrariums and aquariums used by hobbyists and interior designers.

It is an object of the present invention to provide improved aquariums/terrariums of the sort used by hobbyists and interior designers.

It is a more particular object of the present invention to provide an aesthetically pleasing aquatic/terrestrial display unit that provides a variety of novel optical effects, including the illusion whereby aquatic and terrestrial environments are superimposed, sometimes with their geometrical relationships seemingly altered by attendant lensing effects.

The foregoing and additional objects, features and advantages of the present invention will be more readily apparent from the following detailed description thereof, which proceeds with reference to the accompanying drawings.

BRIEF DESCRIPTION OF THE DRAWINGS

FIGS. 1a-d are top, front, side and orthographic views of a first embodiment of the present invention.

FIGS. 2a-d are top, front, side and orthographic views of a second embodiment of the present invention.

FIGS. 3a-d are top, front, side and orthographic views of a third embodiment of the present invention similar to the second embodiment.

FIGS. 4a-d are top, front, side and orthographic views of a fourth embodiment of the present invention similar to the second embodiment.

FIGS. 5a-d are top, front, side and orthographic views of a fifth embodiment of the present invention.

FIGS. 6a-c are top, front and orthographic views of a sixth embodiment of the present invention.

FIG. 7 is a top view of a seventh embodiment of the invention similar to the first and sixth embodiments.

DETAILED DESCRIPTION

Referring to FIG. 1, a first embodiment 10 of the present invention is a combined aquarium/terrarium display unit having first and second portions 14, 16. For expository convenience, the first portion will be considered to be the terrarium portion, and the second portion will be considered to be the aquarium portion. It will be recognized, however, that either portion may serve either purpose.

The terrarium portion 14 is defined by four side walls 18, 20, 22 and 24. The aquarium portion 16 is defined by four side walls 24, 26, 28 and 30. (The aquarium's side walls 26, 28, in this embodiment, are coplanar extension of the terrarium's side walls 18, 22.) It will be noted that the terrarium and aquarium portions share a common side wall 24. One surface 32 of this wall defines a boundary of the terrarium portion, and an opposite surface 34 defines a boundary of the aquarium portion. Others of the walls in this embodiment do not have this characteristic.

The top of the display unit 12 is open, providing access to the two volumes defined thereby. Of course, a covering of metal screen or other material may be placed on top of the unit to keep debris out and energetic residents of the display unit in.

The terrarium and aquarium portions are each supported over a common base 36. The base has a substantially planar bottom surface 38, permitting the unit to sit securely on a table or a stand.

FIG. 2 shows an alternative embodiment 40 of the invention in which the shared wall is curved, with certain advantageous effects noted below.

In this FIG. 2 embodiment, the first, terrarium portion 14 is defined, in part, by a planar front wall 42, and a planar bottom surface 44 that extends rearwardly therefrom. This planar bottom surface 44 has a curved outer periphery 46 that adjoins a curved shared wall 48. The aquarium portion 16 is otherwise defined by planar side and back walls 50, 52, 54. The front planar wall 42 of the terrarium portion 14 extends laterally to adjoin the planar side walls 50, 54 of the aquarium portion 16.

The curve in the shared wall 48 (and the similar curves in later-discussed embodiments) introduces an interesting optic effect by which the water in the aquarium portion 16 acts as a lens (due to its different index of refraction), either magnifying or diminishing the apparent size of objects viewed therein and therethrough, depending on degree of convexity or concavity, respectively, introduced by the curvature. This arrangement can be advantageously used to magnify the contents of the aquarium, or the contents of the terrarium viewed therethrough.

The FIG. 2 embodiment also illustrates that the terrarium and aquarium portions needn't be only horizontally displaced; they can be vertically displaced too. That is, the volumes defined by the terrarium and aquarium portions can be (and are here) relatively disposed so that the aquarium portion extends both beneath and behind the terrarium portion. By this arrangement, an illusion may be formed that a terrestrial environment is being maintained submerged under water.

FIG. 3 shows a variation on the FIG. 2 embodiment in which the terrarium and aquarium portions are not vertically displaced. Each portion has the same height and extends from the same horizontal level.

FIG. 4 shows an arrangement by which the terrarium may be provided with a waterfall or other running water, with the water being provided from the aquarium portion 16.

In the FIG. 4 embodiment 56, the shared wall 58 includes one or more holes 60 that communicate with the aquatic environment on the other side of the wall 58. When the aquarium portion is filled with water above the level of these holes, water pours through into the terrarium portion. A pump 62 desirably recirculates this water back into the aquarium, preferably through a filter 64 to remove any terrestrial debris.

In the illustrated embodiment, the pump and filter are concealed in an enclosed portion 66 at the bottom of the unit. An opaque black plastic sleeve 68 may serve to conceal this equipment from view. A fortuitous feature of this arrangement is that the water reintroduced from the terrarium into the aquarium also oxygenates (to a greater or lesser degree) the aquarium water, sometimes eliminating the need for auxiliary aeration equipment.

FIG. 5 illustrates one of the many unusual arrangements a display unit 70 according to the present invention may take. In this arrangement, the basic volume of the display unit is partitioned into three sections 72, 74, 76 by two vertically extending walls 78, 80. The first and third sections 72, 76 are interconnected by a tube 82 that defines a cylindrical volume passing through the central section 74. The central section 74 (minus the cylindrical portion extending therethrough) is one environment - either terrarium or aquarium. The interconnected first and third sections 72, 76 define the other environment.

In a further variation on this embodiment, the partitioning walls 78, 80 may not extend all the way to the bottom of the display unit, Instead, they may terminate a few inches above the bottom and be joined by a horizontal member 84 that serves as an elevated floor for the central section 74. In such an arrangement, the first and third sections 72, 76 have a common floor 86 and are linked by this narrow passage under the central section 74 (best shown in FIG. 5b).

FIG. 6 shows a display unit 88 different from the earlier discussed embodiments in that its front wall is curved. When filled with water, this unit has the advantageous property noted above by which it magnifies its contents to its viewers.

Curved display units are difficult to fabricate. The difficulty arises not only in the curving of the transparent material, but also in the bonding of the curved surface to adjoining walls. Aquariums typically have volumes of several cubic feet, often containing more than one hundred pounds of water. This large mass of water places a substantial pressure on the unit's joints. The difficulties in making watertight joints that can withstand such pressures when one of the panels to be joined is curved have heretofore discouraged manufacturers from building curved display units.

In the present invention, this problem is desirably overcome by fabricating the unit so that all of the joints are square right angle joints. As shown in FIG. 6, the unit 88 has two planar walls 92, 94 extending out at right angles from a rear corner 96 of the unit. The outer edges 98, 100 of these walls each adjoin opposite edges 102, 104 of the front, curved wall 106 at right angle joints 105. An interesting geometric feature of this design is that the aquarium is enclosed on all sides, yet the sum of the angles defined by its corner joints is only 270 degrees.

FIG. 7 shows a related embodiment 107 in which a shared wall 108 extends between the planar walls 92, 94, thereby defining terrarium and aquarium portions. Again, as in the FIG. 1 embodiment, the side walls of the aquarium portion are coplanar extensions of the side walls of the terrarium portion. However, in this instance, these side walls meet, at the rear corner 110, rather than extending parallel to one another and adjoining opposite edges of a rear wall.

All of the above-described embodiments are constructed principally of transparent acrylic sheets (i.e. Plexiglas). While this material is desirable due to the ease with which it can be shaped and bonded, other materials may of course be used. Non-transparent materials are often used for the base. Certain of the side walls may be made opaque to block light if algae growth in the aquarium is a concern.

It may be noted that each of the illustrated embodiments has a unitary front wall, to which none of the other walls (such as the shared wall) adjoins, except at its periphery. This arrangement has been found visually pleasing, although in other embodiments the front wall may be constructed otherwise.

From the foregoing, it will be recognized that the present invention advantageously provides an aesthetically pleasing display unit that exhibits a variety of novel optical effects, including the illusion whereby aquatic and terrestrial environments are superimposed, sometimes with their geometrical relationships seemingly altered by attendant lensing effects.

Having described and illustrated the principles of our invention with reference to a variety of embodiments thereof, it will be apparent that the invention can be modified in arrangement and detail without departing from such principles. Accordingly, we claim as our invention all such modifications as may come within the scope and spirit of the following claims and equivalents thereto.

We claim:

1. A combined aquarium/terrarium wherein:
   the aquarium includes at least first and second walls which define a volume into which water and aquatic life may be placed;
   the terrarium includes at least first and second walls which define a volume into which terrestrial life may be placed;
   the terrarium and aquarium are each supported over a common base member, said base member having a substantially planar bottom surface;
   the terrarium and aquarium are each provided with means for gaining access to the volume defined thereby;
   at least one of the aforesaid walls is shared between both the aquarium and terrarium, with one surface of said shared wall defining a boundary of one volume, and an opposite surface of said shared wall defining a boundary of the other volume;
   at least one other of the aforesaid walls is not shared between the aquarium and terrarium;
   the shared wall is transparent; and
   the shared wall defines at least one orifice through which water can flow from the aquarium to the terrarium.

2. A combined aquarium/terrarium apparatus according to claim 1 which further includes:

pump means for reintroducing water from the terrarium to the aquarium; and filter means for filtering said water prior to its reintroduction.

3. The apparatus of claim 2 which further includes means defining an enclosure beneath the terrarium in which the pump means and filter means may be concealed.

* * * * *